Nov. 6, 1934.　　　F. W. SPERR, JR　　　1,980,010
BY-PRODUCT AMMONIA RECOVERY METHOD
Filed Dec. 27, 1930　　　2 Sheets-Sheet 2

INVENTOR.
Frederick W. Sperr, Jr.
BY Jesse R. Langley.
ATTORNEY.

Patented Nov. 6, 1934

1,980,010

UNITED STATES PATENT OFFICE 1,980,010

BY-PRODUCT AMMONIA RECOVERY METHOD

Frederick W. Sperr, Jr., Pittsburgh, Pa., assignor to The Koppers Company of Delaware, a corporation of Delaware Application December 27, 1930, Serial No. 505,090

5 Claims. (Cl. 23—196)

This invention relates to improvements in apparatus employed in by-product recovery plants, and in methods of operating the same.

An object of the present invention is to provide efficient and economical apparatus for and methods of removing ammonia from coal gas and other gases.

A further object is to provide an improved method of utilizing phosphatic material in the removal of ammonia from gases and in such a manner that a by-product is produced in the form of a commercially valuable fertilizer.

It has been well known for many years that calcium acid phosphate is capable of absorbing large amounts of ammonia, and it has been entirely logical to undertake the use of commercial superphosphate for the removal of ammonia from coal gas. Several patents have been issued disclosing various proposals to this end, and various processes have been developed in an experimental way, but none of these has attained any commercial success, nor is there known to be any process of this type in operation at the present time.

This lack of success is very remarkable when the advantages to the coke and gas industries and to the fertilizer industry of the use of superphosphate as a means of fixing gaseous ammonia are considered. Such use of superphosphate would eliminate the necessity of using sulphuric acid in a coke plant or gas works, and would furnish a neutral fertilizer with its sulphate content reduced to a minimum and with the ammonia homogeneously distributed throughout.

I have found that by the proper control of conditions in the gas coming from a coking retort, for instance, superphosphate prepared from phosphorite and sulphuric acid may be effectively employed in ammonia removal and at the same time a very desirable fertilizer may be produced. The studies made in connection with the present invention have indicated that the failure of previous undertakings in this direction has been largely due to the following causes:

1. *Reversion of phosphoric acid to an insoluble form.*—It is well known that one of the products of reaction between ammonia and calcium monophosphate, which is the principal phosphoric acid compound in superphosphate, is the insoluble tricalcium phosphate, which is considered by the majority of agricultural authorities to be unavailable or only very slowly available as a plant food. At any rate, whatever may be its real value, this form of phosphate material, insoluble in ammonium citrate solution, is not considered to have any commercial value according to the present official methods of fertilizer analysis (set forth in the latest edition of "Official and Tentative Methods of Analyses", prepared by The American Association of Official Agricultural Chemists), and its production, therefore, represents a direct monetary loss of valuable phosphoric acid.

Some inventors who have undertaken the removal of ammonia from gas with superphosphate have recognized the disadvantage of forming insoluble phosphates and have tried to reduce this formation in various ways, some even proposing to reacidulate the ammoniated superphosphate with sulphuric acid, a proposal which would involve technical difficulties and which would largely nullify the advantages of direct ammoniation. In some proposals, the importance of the reversion of phosphoric acid to the insoluble form is minimized and the manufacture of a product in which most of the $P_2O_5$ is insoluble has been undertaken, but it does not appear that this has met with any commercial success whatsoever.

All processes hitherto proposed for the use of superphosphate to absorb ammonia from coal gas or other gases have necessarily involved the production of a large proportion of insoluble phosphate for the reason that the reversion of $P_2O_5$ to the insoluble form is very likely to result from too long exposure of the superphosphate to the action of ammonia. Such undue exposure is a natural result of any attempt to build up the ammonia content of the ammoniated phosphate above a certain optimum figure. I have found that this optimum figure is in the neighborhood of 4 per cent, or at the most, 5 per cent of ammonia, and as soon as the absorption of ammonia has reached substantially these amounts it is advisable to withdraw the ammoniated superphosphate as soon as possible from further contact with ammonia, as otherwise there will be an undue increase in the percentage of insoluble $P_2O_5$.

A study of the various processes that have hitherto been proposed for the absorption of ammonia from coal gas and other gases by means of superphosphate shows that in all cases, except in certain instances where no attempt has been made to maintain a minimum reversion of $P_2O_5$ to the insoluble form, it has been considered necessary to provide stationary horizontal layers of superphosphate and to cause the gas to pass through these layers. A consideration of the conditions of any such process depending upon the principle of static layers will readily prove that such a process is met by the dilemma of inefficient utilization of material on the one hand and excessive reversion on the other, unless the layers are so thin as to render the process utterly impractical.

To illustrate what is meant, it may be supposed that a stream of coke oven gas, without still vapor, containing 280 grains of ammonia per 100 cubic feet is passed downwardly or upwardly through a 10-inch bed of superphosphate at any reasonable rate, as, for example, 120 cubic feet per square foot per hour. At this rate, during the first three hours, if the proper temperatures are maintained, all of the ammonia will be absorbed in the first 1 inch of superphosphate nearest the source of the ammonia, and within four hours the ammonia content of this first inch will build up to an average of 4 per cent with a reversion of 1.5 per cent. At this point it would be desirable to withdraw this 1-inch layer from any further exposure to the action of ammonia.

However, the layer which has been ammoniated to the desired extent cannot be removed in a static system without removing all of the material in the entire bed, which results in the formation of a product of very low average ammonia content and therefore in the inefficient utilization of the $P_2O_5$. It may be assumed, therefore, that the 10-inch bed mentioned above is kept in place until the last 1 inch furthest away from the source of the ammonia shows an average content of 4 per cent ammonia. This will require a total of 60 hours for the entire bed and will necessitate the use of one or more additional 10-inch beds to take up the ammonia escaping during this period. This means that the first 1 inch of material will be exposed to the action of ammonia 56 hours longer than necessary. The ammonia content of this first 1-inch layer will have increased to 8 per cent, but the amount of insoluble $P_2O_5$ will have largely increased, so that this first 1-inch layer will show a reversion of 9 per cent. In other words with 1 per cent insoluble originally the total insoluble $P_2O_5$ will have increased to about 10 per cent.

It may be seen from the above and further considerations that in any system in which a gas containing ammonia is forced through static layers of superphosphate, the product will be irregular in analysis and will either have a considerable percentage of insoluble $P_2O_5$ or else a very low $NH_3$ content and a large amount of material inefficiently used for absorption of ammonia. Some improvement might be obtained by periodically reversing the direction of flow of the gas, but this apparently has not been heretofore proposed. There can be no question that in the practical execution of any of the processes hitherto proposed the tendency has been toward building up unduly high percentages of ammonia in at least part of the material, with the consequent high reversion losses.

2. *Failure to control temperature.*—It is well known that excessive temperatures in the absorption of gaseous ammonia by superphosphate, lead to excessive reversion losses. For example, in using undiluted ammonia gas, it has been stated that the temperature should not exceed 75° C. The reactions between ammonia and the superphosphate are exothermic and produce considerable heat.

Coal gas with its normal ammonia content is a very effective agent for the ammoniation of superphosphate because the large excess of non-reacting gases readily carries away the heat of reaction and, with the proper apparatus, provides a very satisfactory means of temperature control. Hitherto, however, in the extraction of ammonia from coal gas by means of superphosphate, there does not appear to be any recognition of the importance of temperature control.

I have found that there is not only an upper limit but also a lower limit for satisfactory operation. With respect to the upper limit, the apparatus used for ammonia removal should be well insulated to prevent local cooling, and the temperature should always be above the point of condensation of any moisture or hydrocarbons present, but it should preferably not exceed 50° C. If the dew point with respect to moisture and hydrocarbons exceeds this temperature, these substances should be removed by prior treatment. The gas should have sufficient "superheat" above its dewpoint to remove the moisture liberated during ammoniation.

The lower temperature limit (assuming no condensation of moisture or hydrocarbons) is important from the standpoint of the capacity of the apparatus. The rate of reaction between the superphosphate and the diluted ammonia undergoes a substantial decrease at temperatures below about 30° C., and in order to secure satisfactory absorption the rate of passing gas through the apparatus must be substantially reduced at these lower temperatures. There is a certain relation between this minimum temperature and the ammonia content of the gas. For example, the minimum temperature will be lower for gases of higher ammonia content and higher for gases of very low ammonia content. However, inasmuch as the ammonia content of coal gas is relatively uniform, the above figure of 30° C. may be taken as representative of normal conditions.

3. *Contamination of ammoniated superphosphate with ammonium thiocyanate.*—According to some authorities, this has been the most important cause for the failure of processes using superphosphate for the removal of ammonia from coal gas. Schucht's Handbook, "Die Fabrikation des Superphosphates" (4th edition 1926) states, "Superphosphate has been used experimentally for the purification of illuminating gas but the resulting 'gas phosphate' was unusable on account of containing ammonium thiocyanate."

The occurrence of this substance in the product of previous processes appears to have been largely due to the deposition of ammonia liquor spray mechanically carried along with the gas. Such spray always contains ammonium thiocyanate. Furthermore, unless care is taken to maintain proper temperatures, there may be deposition of ammonium sulphide which will inter-act with any hydrocyanic acid in the gas to form ammonium thiocyanate. This substance, even in small amounts, is extremely toxic to plants.

Incidentally, coal gas has certain peculiar advantages in the ammoniation of superphosphate, and some of them are as follows:

1. *Ease of temperature control.*—The temperature of the coal gas is readily capable of exact regulation, and this gas is a valuable medium for carrying away the heat of reaction.

2. The maintenance of uniform moisture conditions in the superphosphate is important. Excessive moisture tends to increase reversion losses. Water is liberated during the ammoniation and the coal gas acts as a medium for removing this.

3. Even distribution of the ammonia in contact with the superphosphate is facilitated and local irregularities of reaction are avoided.

4. The diluted form of ammonia is of particular advantage for any continuous process of ammoniation. So far, the use of highly concentrated ammonia, even in small amounts, has been successful only in batch or intermittent treatment.

5. The presence of carbon dioxide in the coal gas is of importance because it facilitates absorption of part of the ammonia by the gypsum present in the superphosphate according to the following reaction:

$$CaSO_4 \cdot 2H_2O + 2NH_3 + CO_2 = CaCO_3 + (NH_4)_2SO_4 + H_2O$$

Thus the amount of ammonia entering into reactions that may favor reversion of the $P_2O_5$ is correspondingly reduced.

The present invention comprises, in general, apparatus and processes to be employed in the treatment of gas to produce valuable by-products, and more particularly in the removal of ammonia from gases by bringing the gases into contact with superphosphate material to permit absorption of the ammonia and at the same time bring about the formation of ammoniated superphosphate with minimum reversion of $P_2O_5$.

As most coal gas is now produced in by-product coke ovens, the following description refers particularly to the apparatus and process operating in connection with an installation of coke ovens as, for instance, of the type comprising a plurality of coking chambers placed side by side with heating flues therebetween, and having a common collecting main into which gases and vapors from the ovens are passed. However, it is to be understood that the principles involved may also be applied to the coal gas from gas retorts or low-temperature carbonization apparatus, or to the gases from gas producers, or from the distillation of shale, and a variety of other materials. The gases to be treated contain substantially 200 to 500 grains of ammonia per 100 cubic feet.

In the accompanying drawings forming a part of this specification and showing for purposes of exemplification a preferred form and manner in which the invention may be embodied and practiced, but without limiting the claimed invention specifically to such illustrative instance or instances, Figure 1 is an elevational view, partially in cross section, of apparatus employed in connection with the present process in a preferred arrangement;

Figure 1:
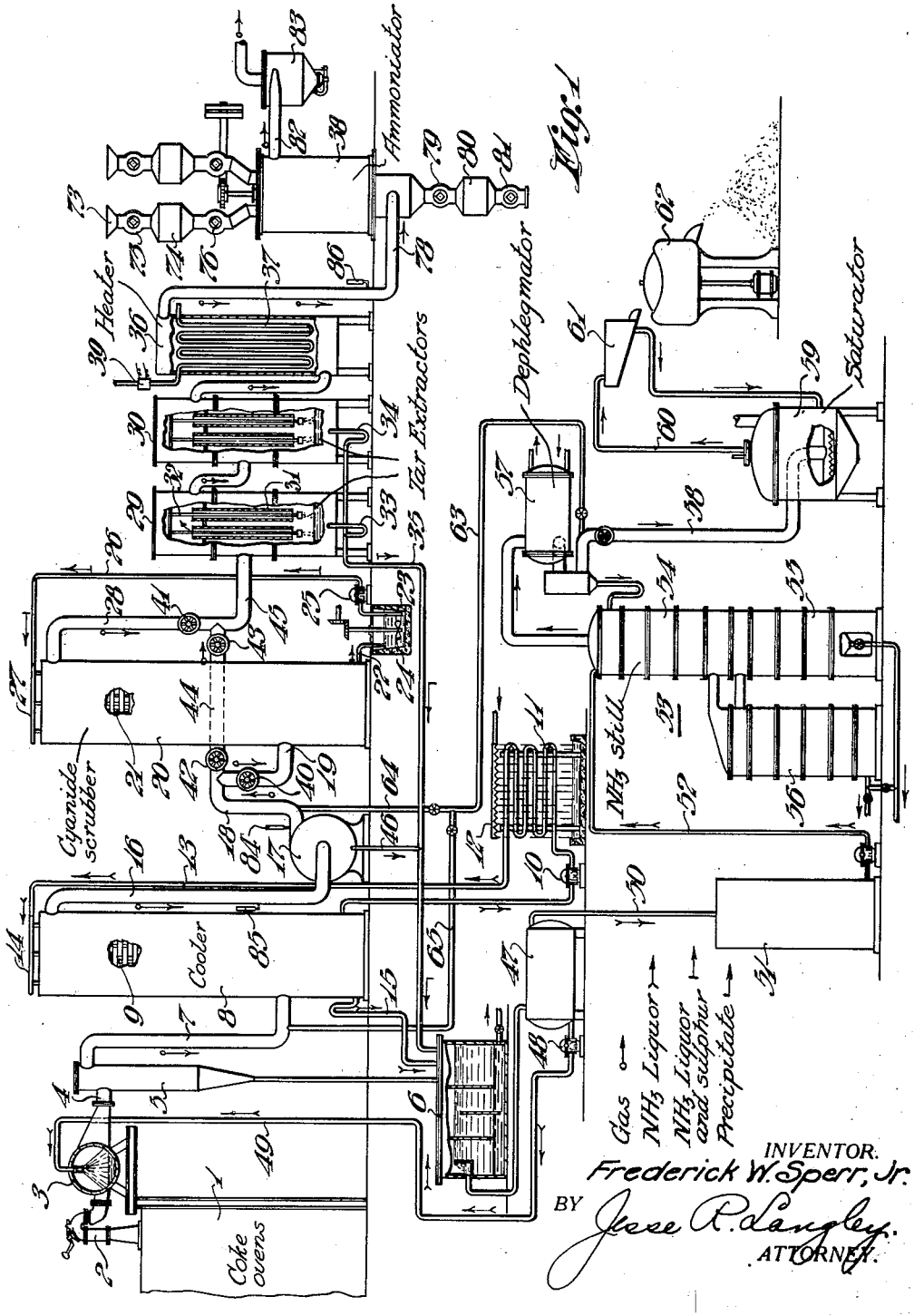

Referring to Fig. 1, gases and vapors from a coke oven 1 pass through standpipe 2 into a collecting main 3 and thence through a suction main 4 into a pitch trap 5. A part of the tar, moisture and ammonia is deposited in the collecting main, suction main and pitch trap and runs from these into the decanter tank 6. The gas passes from the pitch trap 5 through a pipe 7 into the cooler 8. This cooler is of the so-called direct-contact type and is filled with hurdles 9, over which cooled ammonia liquor is continuously recirculated. This liquor is pumped from the bottom of the cooler 8 by a pump 10 through cooling coils 11, over which water is distributed from the trough 12. The cooled liquor passes up through a pipe 13 and is distributed by means of sprays 14 at the top of the tower 8.

This cooled liquor contains additional moisture and ammonia from the gas, together with some additional tar, and the excess of this runs out through a pipe 15 into the tank 6.

The gas leaving the cooler 8 passes through a pipe 16 to an exhauster 17, and thence through pipes 18 and 19 into the bottom of a cyanide scrubber 20, the interior of which is provided with hurdles 21 over which a suspension of sulphur in ammonia liquor is continuously pumped.

In the reactions between the sulphur, ammonia, hydrogen sulphide and hydrogen cyanide in the gas and solution, the hydrogen cyanide is converted into ammonium thiocyanate, which runs out through the bottom of the scrubber through a pipe 22 into a circulating tank 23. The circulating tank is equipped with an agitator 24 for maintaining the sulphur in suspension, and the suspension is pumped by a pump 25 through a pipe 26 to sprays 27 at the top of the scrubber 20. Additional sulphur is added to take the place of that used up in the reaction, and this sulphur is advantageously used in the form of finely divided flotation sulphur recovered in gas purification processes.

The gas leaving the scrubber 20 passes through a pipe 28 into apparatus for extracting tar. It has been found advantageous to use a Cottrell electrical precipitator, and it is preferred to use two of these in series as it is of the utmost importance that substantially all of the tar and mechanically entrained moisture be removed. Two Cottrell precipitators 29 and 30 are shown in the drawings, and are of a conventional type having a plurality of tubes 31 up which the gas passes in contact with electrodes 32. The precipitated materials are led through outlets 33 and 34 to a pipe 35 which is connected to the tank 6.

The gas passes from the precipitator 30 into a heater 36, which is a simple steel tower containing steam coils 37 with provision for the automatic and exact regulation of the temperature of the gas which is about to be passed into the ammoniator 38 wherein the ammonia is absorbed by superphosphate. A thermostatically controlled valve 39 may be placed in the steam line whereby the temperature of the heater 36 may be regulated. Instead of the heater 36, other simple heating means, such as steam coils within or just outside the gas piping and the ammoniator, may be substituted. Also, under certain conditions with proper regulation of the cooler 8, the heater 36 may be omitted.

The simple system described above for the removal of hydrocyanic acid is very effective in preventing any cyanide compounds from being carried along with the gas and contaminating the ammoniated superphosphate, but, of course, a variety of other hydrocyanic acid removal systems may be substituted. However, it has been found that with suitable arrangements for controlling the temperature of the gas so as to prevent any condensation in the ammoniation apparatus, and with suitable precautions for preventing any ammonia liquor spray from being carried along with the gas into the ammoniation apparatus, the removal of hydrocyanic acid by a special scrubber in this system is unnecessary.

If any hydrogen cyanide is present in the gas it is preferable to operate the plant with a minimum percentage of oxygen, namely, below about 0.5 per cent.

The collection of ammonia liquor condensed from the gas in the collecting main, suction mains and the cooler, and the distillation of this liquor in an ammonia still, as will be presently described, is also very effective in preventing contamination of the ammoniated superphosphate in contrast to previous processes, because such condensed liquor contains a considerable amount of ammonium thiocyanate which is decomposed in the ammonia still. In previous processes no precautions appear to have been taken for the careful separation and distillation of this condensate.

As stated above, the hydrocyanic acid scrubber is not absolutely necessary when suitable precautions are taken in modern coke oven plants, and it may be dispensed with or by-passed by closing valves 40 and 41, opening valves 42 and 43, and causing the gas to pass from the pipe 18 through pipes 44 and 45 into the precipitator 29.

The preferred order of arrangement of the exhauster 17, the scrubber 20 and the precipitators 29 and 30 is that shown in the drawings. However, the positions of these units may be interchanged as desired. For instance, the scrubber 20 may be placed before the exhauster 17 with the precipitators 29 and 30 coming after the exhauster, or the precipitators 29 and 30 may be placed before the exhauster, and the scrubber 20 after the exhauster.

The exhauster 17 which may be of the centrifugal type, as shown, is operated as is usual in the by-product coke oven art to maintain a constant and uniform pressure in the collecting main. Tar from the exhauster may be drained out through a pipe 46 which is connected to the pipe 35 leading to the tank 6.

Ammonia liquor in the tank 6 overflows into a tank 47 from which it may be pumped for flushing purposes into the collecting main 3 by means of a pump 48 through a pipe 49, or liquor from the tank 47 may be passed through a pipe 50 into a tank 51. Any excess of ammonium thiocyanate liquor from the tank 23 may be transferred into this tank 51, or else the ammonium thiocyanate liquor may be separately disposed of.

The ammonia liquor from the tank 51 is transferred through a pipe 52 into an ammonia still 53, which has the usual free section 54, lime leg 55, and fixed section 56. It is also advisable to provide a dephlegmator 57. The ammonia still is operated in the usual manner, and the ammonia vapors from the still may be employed in the manufacture of ammonium sulphate by causing them to pass through a pipe 58 into a saturator 59, which has the usual equipment of ejector 60, drain table 61 and centrifuge 62, with provision for disposal of waste gases.

Instead of manufacturing ammonium sulphate from the ammonia still vapors, these vapors may be mixed with the gas before it enters the ammoniator 38. If a hydrocyanic acid scrubber is used, the vapors may be conducted through pipes 63 and 64 into the pipe 18 so as to mix with the gas entering the scrubber 20. If the hydrocyanic acid scrubber is not used, the vapors may be caused to pass through pipes 63 and 65 into the gas inlet of the cooler 8.

For the ammoniation apparatus, it has been found advantageous to employ equipment designed and operated on the principle of the mechanical sulphide ore roasting furnaces employed in metallurgical operations. The present adaptation and application of this type of equipment appear to be novel.

Figure 2:
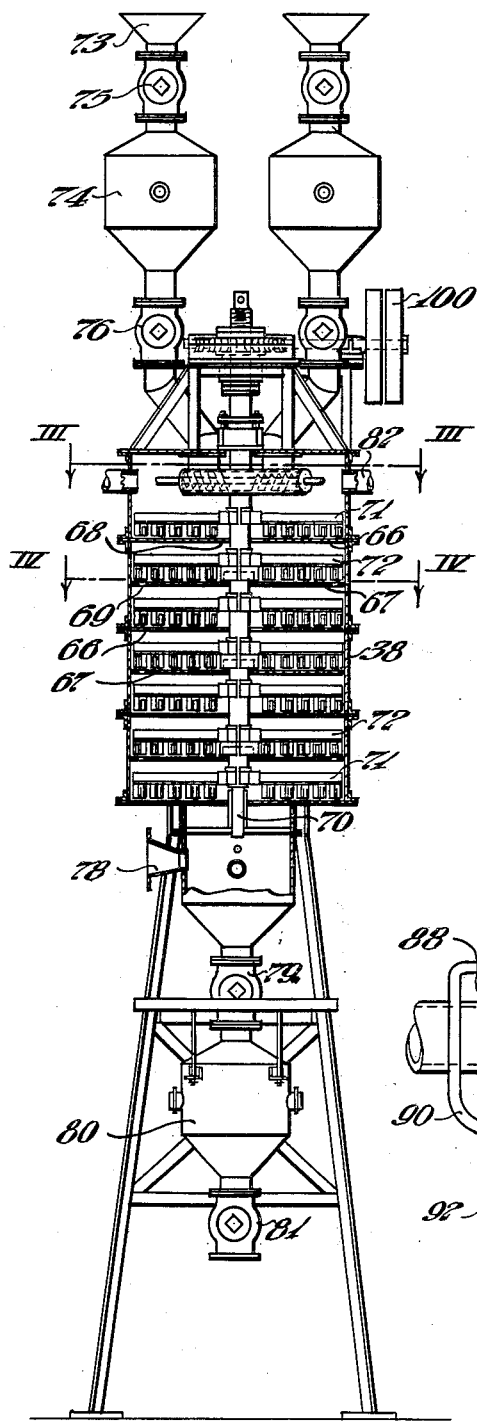
Fig. 2 is an elevational view, partially in cross section, of one form of contact apparatus for gases and superphosphate material.
Figure 3:
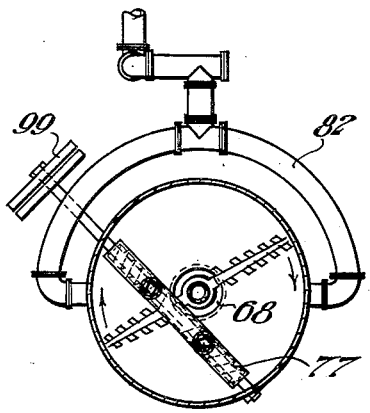
Fig. 3 is a view, partially in cross section of Fig. 2 taken on line III—III in the direction of the arrows.
Figure 4:
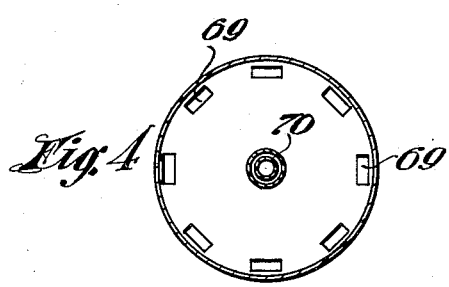
Fig. 4 is a cross sectional view of Fig. 2 on line IV—IV in the direction of the arrows.

As shown in Fig. 2, the ammoniator 38 comprises preferably a cylindrical chamber having therein a series of evenly spaced superposed horizontal trays. Two types of trays are used, as, for instance, 66 and 67, arranged alternately, trays 66 having openings 68 in the center, and trays 67 having openings 69 adjacent to the wall of the ammoniator 38. A shaft 70 is mounted vertically in the center of the ammoniator for rotating the rabble arms 71 and 72 which are designed to push material either toward the center or toward the sides of the ammoniating chamber.

For instance, the rabble arms mounted above the trays 66 are so designed that upon rotation of the shaft, the blades push the superphosphate material toward the openings 68, whereupon the material drops to the trays 67, and the rabble arms above these trays 67 have blades which push the material toward the openings 69.

The superphosphate material is fed into the hopper 73 and is permitted to drop into the chamber 74 by opening a valve 75. When the chamber 74 is filled, the valve 75 is closed, and a valve 76 is opened to permit the passage of the superphosphate into the ammoniating chamber 38. Two such devices for forwarding the material into the chamber 38 may be provided as shown, so that one may be filled while the other one is being emptied. Access to the chamber 74 is controlled by the valves 75 and 76 to prevent the escape of gases from the ammoniating chamber while the latter is being charged. It has been further advantageous to exhaust the gases from the chamber 74 before it is filled with material.

The phosphate material is dropped into a screw conveyor 77, from whence it is dropped onto the uppermost tray 76, and is zigzagged downwardly through the chamber while the layers of material on the trays are maintained in continuous agitation. The gases entering the ammoniator at the bottom through an inlet pipe 78 are passed upwardly in countercurrent relationship with the material treated.

At the end of the desired period, the ammoniated product is immediately passed out of contact with the gases through the valve 79 and into a chamber 80 from which it may be removed through a valve 81. The valve 79 is ordinarily kept open except when the valve 81 is opened. When removing material from the chamber 80, the valve 79 is closed and before opening the valve 81 the gases in the chamber 80 may be exhausted.

The gases substantially free from ammonia, pass out of the ammoniator 38 through a pipe 82 and thence through a dust catcher 83 wherein any suspended dust is removed.

As the regulation of the temperature in the ammoniator is very important, the heater 36, the ammoniator 38 and also the dust catcher 83, as well as all connecting piping, should be effectively insulated. All precautions should be taken to prevent condensation of moisture which might be mechanically carried through the heater and which might enter the ammoniator in the form of spray, thus risking some contamination with ammonium thiocyanate.

It is preferable to adjust the heater 36 so that the gas will enter the ammoniator at a temperature of about 40° C. It is also important to regulate the operation of the cooler 8 so that the gas entering the ammoniator will carry at least 5° of superheat to remove the moisture produced in the ammoniation and to obviate any possibility of condensing moisture in the ammoniator. Allowance should, of course, be made for the pressure of the gas entering the ammoniator and for the heat of compression produced by the exhauster.

For example, with a gauge pressure of two pounds per square inch after the exhauster, and with a temperature of about 40° C. in the pipe leading to the ammoniator 38, the gas should be cooled in the cooler 8 to about 30° C. If the temperature of the cooling water is high, then the temperature of the gas from the cooler will be high, but the temperature of the gas entering the ammoniator should not exceed about 50° C. and under extreme conditions, some artificial cooling may be necessary in connection with the operation of the cooler 8. However, if the temperature of the gas from the cooler is below 30° C., it may be heated up to at least this latter temperature.

On the other hand, conditions should be adjusted so that the gas entering the ammoniator is not too cool. 40° C. is the preferred temperature, and this should preferably not be permitted to go below 30° C., otherwise the capacity of the ammoniator is seriously reduced and there is danger of loss of ammonia in the exit gases. For observation purposes, thermometers may be placed at various points, as for instance, at 84, 85 and 86. In certain cases the superphosphate may be heated before entering the ammoniator.

The rate of feed of superphosphate into the ammoniator should be adjusted to correspond with the ammonia content of the gas, and the rate of flow of the gas, in order to maintain a uniform ammonia content in the ammoniated superphosphate withdrawn from the bottom tray. With uniform operation of the coke ovens and the condensing system, the ammonia content of the gas is quite uniform but the rate of flow of the gas is usually subject to fluctuations and automatic arrangements may be provided to adjust the rate of feed of the superphosphate and the rate of movement of the rabble arms in the ammoniator so that a uniform ratio of the flow of superphosphate to the flow of gas is always maintained.

Figure 5:
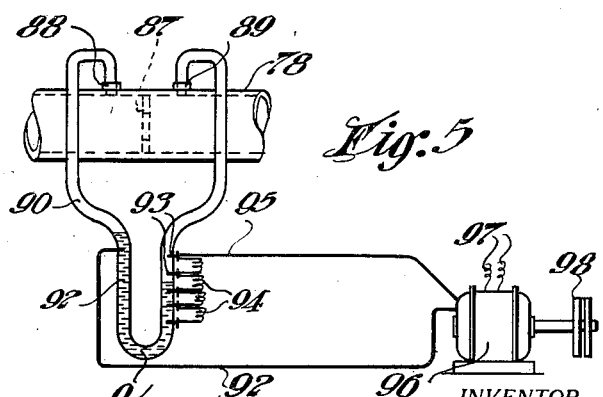
Fig. 5 is a diagram of apparatus which may be employed in operating the contact apparatus shown in Fig. 2.

One example of apparatus for thus automatically operating the ammoniator 38 is shown in Fig. 5. The pipe 78 leading to the ammoniator from the heater 36 may be provided with an orifice 87 with the ends 88 and 89 of a U-tube 90 leading from either side of the orifice. The tube 90 contains a fluid 91 capable of conducting an electric current. On one side of the tube, a contact wire 92 passes through the wall of the tube with its end in the fluid conductor 91. Several contact points 93 are placed on the other side of the tube at various levels and connected to each other by a series of resistances 94.

The wire 92 and a wire 95 from the uppermost contact point 93 are connected to the field winding of an electric motor 96 that is supplied with current through conductors 97.

The shaft of the motor 96 is provided with a pulley 98 which by a suitable belting arrangement, drives a pulley 99 which turns the screw conveyor 77 in the ammoniator, and also a pulley 100 which turns the rabble arms.

With increase of the rate of flow of gas in the pipe 78 it is seen that the motor 96 will speed up which in turn speeds up the conveyor 77 thereby increasing the rate of feed of superphosphate to the top tray of the ammoniator. The rate of movement of the rabble arms is also increased. With decrease of the rate of flow of gas in the pipe 78, the motor speed decreases whereby the rate of feed of the superphosphate is decreased.

The percentage of ammonia in the ammoniated product should not ordinarily exceed 5%, and 4% is the usual figure. The percentage of insoluble $P_2O_5$ in the ammoniated product depends upon that present in the original superphosphate but the increase in the ammoniation operation should not exceed 1.5%. This product will be free from ammonium thiocyanate and other toxic substances.

It may be readily seen that the operation of the ammoniator is such as to withdraw the ammoniated product from the action of the ammonia gas as soon as this product has attained the desired percentage of ammonia and this, as has been previously stated, is one of the conditions essential to preventing high reversion.

The ammonium sulphate referred to above may be mixed with part or all of the ammoniated superphosphate, thereby providing for the supply of fertilizer mixtures containing more nitrogen than is present in the ammoniated superphosphate. The ammonium sulphate may be advantageously mixed with the superphosphate just before it enters the ammoniator, or it may be introduced separately through a separate feeding device into the top tray of the ammoniator. If this is done, no special precautions need be taken for the washing of free acid from the ammonium sulphate crystals in the centrifuge 62. In fact, any water washing may be dispensed with entirely, as the free acid will be effectively neutralized in the ammoniator 38.

Certain advantages may be gained by allowing the mixture of ammonium sulphate and superphosphate to stand until the well known "setting" action is substantially completed, and then crushing the set or caked mixture and introducing it into the ammoniator. In this way the dustiness of the superphosphate is largely reduced and loss of material avoided.

From the above description of the present invention, it will be seen that the following is accomplished:

1. The recovery of ammonia in useful form from coal gas, or any other gases containing substantially the same amounts of ammonia as coal gas, by treatment of the gas with superphosphate.

2. The present invention eliminates the disadvantages that have attended previous efforts to utilize superphosphate for this purpose.

3. The present invention obtains the above mentioned advantages of diluted gaseous ammonia for the preparation of ammoniated superphosphate.

4. By the use of the above described apparatus and method in the removal of ammonia there is a saving in the cost of acid and by discarding the usual type of saturator, the operation is clean and the fertilizer product is of a superior mechanical condition. The apparatus is simple and may be made of steel since there is no corrosion when operated under the conditions set forth. This eliminates the need for expensive lining materials ordinarily used when using acids. Furthermore, there is a considerable power saving, owing to a very low back pressure of about three to six inches as compared with a back pressure of thirty to forty inches when an acid saturator is used.

Various superphosphate material, including good den superphosphates and others, may be employed in the present process and apparatus.

Very satisfactory results are obtained with a superphosphate material prepared and employed as set forth in a copending application of F. W. Sperr, Jr., Serial No. 505,091, filed of even date herewith.

The invention as hereinbefore set forth is embodied in a particular form but may be variously embodied within the scope of the claims hereinafter made.

I claim as my invention:

1. The method of recovering ammonia from coal gas with solid superphosphatic material as ammoniated superphosphate which comprises: flowing coal gas containing ammonia along and in surface contact with the surface of a countercurrent flowing bed containing the proportionate quantity of solid superphosphatic material required to produce a uniform 4-5% ammoniated product with the total quantity of ammonia in a predetermined volume of said coal gas; effecting such counterflow and surface contact by maintaining said bed in successive superposed moving layers moving with constant agitation of the layers to bring lower portions thereof to the surface and with gradual and continual discharge of the solid phosphatic material from layer to layer of the bed, and by flowing the coal gas through substantially free gas-spaces over but not through the layers and in surface contact with only the upper surfaces of the layers in succession in opposite direction to the flow of the respective layers during their flow and agitation as aforesaid; and thereby recovering the ammonia from said coal gas and ammoniating said phosphatic material; and regulating and controlling the quantity of fresh phosphate supplied to and ammoniated phosphate discharged from the bed and the rate of movement thereof in accordance with the ammonia content and rate of flow of the aforesaid predetermined volumes of coal gas along the surface of said bed, to maintain the proportion of said solid material to the volumes of coal gas aforesaid; and thereby substantially completely removing the ammonia from the coal gas with simultaneous recovery of a uniform 4-5% ammoniated phosphatic product.

2. A method as claimed in claim 1 and which further includes maintaining a temperature above 30° C. but below 50° C. during the counterflow and contact of the coal gas with said bed of phosphatic material.

3. A method as claimed in claim 1 and which further includes maintaining a temperature above 30° C. and below 50° C. during the counterflow and contact of the coal gas with said bed of phosphatic material and maintaining the moving bed and coal gas against local cooling thereof during such counterflow and contact with each other.

4. A method as claimed in claim 1 and in which the coal gas employed is first substantially freed of tar and cyanogen compounds, and in which a temperature between about 30° C. and 50° C. is maintained during the ammoniating of the phosphatic material.

5. A method as claimed in claim 1 and in which the regulation and control of supply and discharge of solid material to the moving bed and the rate of flow thereof are effected automatically by and in accordance with the rate of flow of the coal gas over said bed.

FREDERICK W. SPERR, Jr.